United States Patent Office 2,808,407
Patented Oct. 1, 1957

2,808,407

NEW IMIDAZOLIUM COMPOUNDS

Franz Ackermann, Binningen, and Adolf-Emil Siegrist, Basel, Switzerland, assignors to Ciba Limited, Basel, Switzerland, a Swiss firm No Drawing. Application January 17, 1955,
Serial No. 482,432

Claims priority, application Switzerland
January 22, 1954

8 Claims. (Cl. 260—240)

The present invention is based on the observation that new, valuable imidazolium compounds are produced when arylimidazoles of the constitution (1) 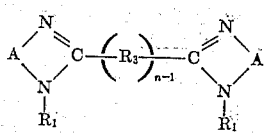

in which the two radicals A indicate aromatic nuclei, if desired substituted, in which two vicinal carbon atoms are linked to the two imidazole nitrogen atoms, in which $R_1$ stands for hydrogen or an alkyl, aryl or aralkyl radical which may be substituted, $R_3$ for a divalent bridge member which contains at least one double bond which forms with the $>C=N$ double bonds of the imidazole rings an uninterrupted series of conjugated double bonds and $n$ stands for a whole number of a maximum of 2, or the salts of these imidazoles, are reacted with compounds which are capable of quaternating an imidazole nitrogen atom.

As starting materials for the process of the present invention there are concerned, for example, those compounds in which the radicals A are naphthalene or preferably benzene radicals. $R_1$ can be a phenyl radical, if desired further substituted, an aralkyl radical, as for example a benzyl radical or menaphthyl radical, but preferably a low molecular weight alkyl radical (for example a methyl, ethyl, propyl or butyl group or also a hydroxyalkyl group such as hydroxyethyl) or a hydrogen atom.

Under the general Formula 1 there fall, for example the dibenzimidazoles of the formula (2) 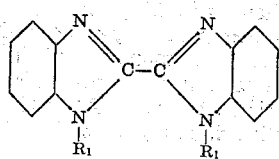

When the coefficient $n$ of the Formula 1 is equal to 2, the diimidazoles contain the divalent bridge member $R_3$. This can be of aliphatic, aromatic, heterocyclic or araliphatic nature. For example the following atom grouping may be given for the bridge member $R_3$ :

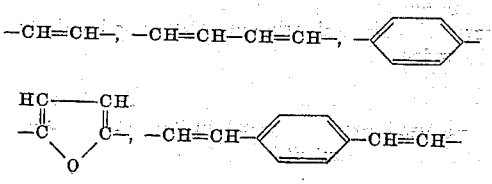

In general the imidazoles of the Formula 1, of which the bridge member $R_3$ is a simple ethylene bridge

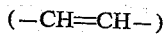

lead to especially valuable products.

As compounds for the quaternation of the imidazoles of the Formula 1 there are primarily concerned the customary alkylation and aralkylation agents. There may be mentioned for example: methyl iodide, ethyl bromide, isopropyl chloride, sec.-butyl bromide, dodecyl bromide, epichlorhydrin, dimethyl sulfate, benzyl halides and benzyl halides substituted in the nucleus, for example by halogen, alkyl or alkoxy groups, such as benzyl chloride, p-chlorobenzyl chloride, also menaphthyl chloride, aryl sulfonic acid esters, especially those of the benzene series with low molecular weight alkyl groups, such as toluene sulfonic acid ethyl or methyl ester and also compounds which contain a water-solubilizing group, such as halogen alkyl or aralkyl sulfonic acids, for example bromethane sulfonic acid or benzyl chloride disulfonic acid. When salts of imidazoles are the basic materials, alkylene oxides, such as ethylene oxide, propylene oxide or glycide can be used for quaternation, or finally low molecular weight aliphatic alcohols such as methanol or ethanol. The quaternation takes place under conditions customary for such a reaction, suitably by heating of the components to elevated temperature, for example 50–200° C., if desired under pressure. It may be of advantage to use inert solvents such as alcohols, for example methanol or ethyl alcohol, or also dioxane, monomethyl glycol, benzene, toluene, nitrobenzene or mixtures of such solvents. In some cases it may be of advantage to use an excess of the quaternating agent.

The imidazolium compounds obtainable by quaternation of the imidazoles of the Formula 1 correspond to the formula (3) 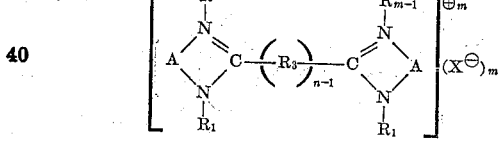

in which the two radicals A indicate the same or different, if desired substituted, aromatic nuclei, in which two vicinal carbon atoms are linked to the two imidazole nitrogen atoms, R stands for an alkyl or aralkyl radical which may be substituted, $R_1$ for hydrogen or an alkyl, aryl or aralkyl radical which may be substituted, $R_3$ for a divalent bridge member which contains at least one double bond which forms with the $>C=N$ double bonds of the imidazole rings an uninterrupted series of conjugated double bonds, $m$ and $n$ stand for whole numbers of a maximum of 2 and X stands for an anion.

These new compounds, in solution or when deposited upon a substratum, exhibit in ultraviolet light green blue to violet fluorescence and are therefore suitable as optical brightening agents. The method of application for this purpose can be such that the material to be treated is saturated with a solution, especially an aqueous solution, or a dispersion of the compound concerned and, after treatment in a hydro-extractor or squeezing out, dried. Besides the aqueous solutions mentioned, solutions in organic solvents can also be used for the purposes concerned. It is also possible to treat materials with the compounds in dispersed form, for example with dispersions which have been produced with dispersing agents such as soaps, soap-like substances, polyglycol ethers or fatty alcohols, sulfite waste liquor or condensation products with formaldehyde of naphthalene sulfonic acids which may be alkylated.

The specified compounds, especially those which are suitable as brightening agents, can also be applied to the materials to be treated in the course of manufacture, for example by introduction thereof into a paper pulp or a viscose solution to be used for the manufacture of films or threads, or also into another spinning mass, for example one comprising a linear synthetic polyamide or a spinning solution containing acetyl cellulose.

The new compounds can also be applied as brightening agents as follows:

(a) In admixture with dyestuffs or as addition to dyebaths, printing, discharge or reserve pastes. They can also be used for the after-treatment of dyeings, printings or discharge prints.

(b) In admixture with chemical bleaching agents or as additions to bleaching baths.

(c) In admixture with finishing agents, such as starch or synthetic finishes. The products of the invention can also be used, for example, by addition to baths intended for the production of a crease-proof finish.

The arylimidazolium compounds can also be used in conjunction with washing agents. The washing agents and brightening agents can be added separately to the wash baths to be used. It is also of advantage to use washing agents which contain the brightening agents of this invention admixed therewith.

The following examples illustrate the invention, the parts being by weight:

*Example 1*

29 parts of α:β-di-[N-methyl-benzimidazyl-(2)]-ethylene are stirred for 8 hours at 145 to 150° C. with 88 parts of p-toluene sulfonic acid ethyl ester. The mass is then cooled, treated with alcohol and then made completely cold. The separated product is filtered off, washed with alcohol and dried.

α:β-Di-[N-methyl-N'-ethyl-N'-p-toluene sulfobenzimidazyl-(2)]-ethylene is obtained of the formula

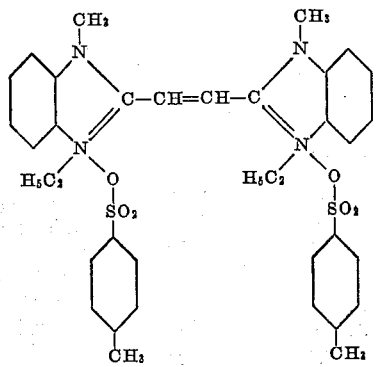

as a yellow powder which can be crystallized from alcohol and thus obtained pure. The solution, when exposed to ultraviolet rays has a strong bluish fluorescence.

By using in the above example instead of 29 parts of α:β-di[N-methylbenzimidazyl-(2)]-ethylene an equimolecular quantity of α:β-di[N-benzyl-benzimidazyl-(2)]-ethylene, a product is obtained which possesses similar properties.

By using instead of the p-toluene sulfonic acid ethyl ester 88 parts of p-toluene sulfonic acid methyl ester, a light colored powder is obtained which is soluble in water and solutions of which, when exposed to ultraviolet rays, exhibit a bluish fluorescence.

*Example 2*

The directions of Example 1 are followed but instead of using α:β-di-[N-methyl-benzimidazyl-(2)]-ethylene, α:β-di-[benzimidazyl-(2)]-ethylene is used.

The resulting yellow, water-soluble product of the probable formula

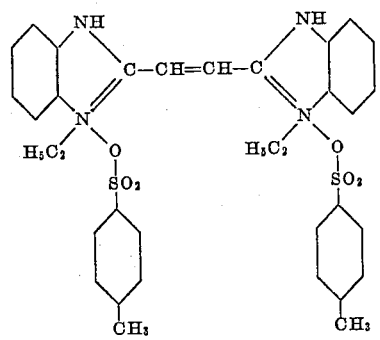

possesses similar properties to that of Example 1. It is suitable for the optical brightening of textiles, as for example acetate artificial silk or cotton.

Products with similar properties are obtained when instead of α:β-di-[benzimidazyl-(2)]-ethylene 6:6'-dimethyl- or 6:6'-dichloro-α:β-di-[benzimidazyl-(2)]-ethylene is quaternated in the manner specified with p-toluene sulfonic acid ethyl ester.

*Example 3*

50 parts of α-[benzimidazyl-(2)]-β-[N-hydroxyethyl-benzimidazyl-(2)]-ethylene are heated with 300 parts of dimethyl sulfate for 3 hours to 140–150° C. After cooling, the whole is treated with water and allowed to cool completely. The separated condensation product is filtered off, washed with aqueous sodium chloride solution and dried. The yellowish powder is soluble in water with bluish fluorescence. It can be used for the optical brightening of viscose spinning masses.

*Example 4*

20 parts of 1:4-di-[benzimidazyl-(2)]-benzene, 60 parts of dimethyl sulfate and 200 parts of dioxane are heated for 18 hours under reflux. After cooling, the condensation product is filtered off, washed with dioxane and acetone and dried.

A light colored powder is obtained which is soluble in water. The solution, when exposed to ultraviolet rays, exhibits a bluish fluorescence.

By using instead of the above dibenzimidazole, α:β-di-[benzimidazyl-(2)]-ethylene, a yellowish powder with similar properties is obtained.

*Example 5*

5 parts of α:β-di-[N-methyl-benzimidazyl-(2)]-ethylene dihydrochloride are heated in a closed tube to 180–185° C. for 15 hours with 20 parts of methanol. After cooling, the separated quaternary condensation product is filtered off, washed with methanol and dried.

A light colored powder is obtained which is soluble in water. The solution when applied to cellulosic material and exposed to ultraviolet rays, exhibits a bluish fluorescence.

*Example 6*

To a fine suspension of 150 parts of α:β-di-[N-methylbenzimidazyl-(2)]-ethylene in 2500 parts of water 200 parts of dimethyl sulfate are added within 3–4 hours at 55–60° C. The temperature is thereupon raised to 65° C. and maintained at this point for about one hour, as a result of which a solution is produced. To the solution 375 parts of sodium chloride are then added and the separated condensation product is filtered off, washed with sodium chloride solution and dried. The resulting yellow powder is soluble in water with a bluish fluorescence. It can be used for the optical brightening of polyester fibers such as "Dacron" or "Terylene."

Example 7

40 parts of α:β-di-[N-methyl-benzimidazyl-(2)]-ethylene are heated for 24 hours in a pressure vessel at 165–170° C. with 500 parts of dioxane and 120 parts of ethyl chloride.

After cooling, the reaction mixture is poured into water, the separated condensation product filtered off, washed with water and crystallized from water.

Small yellow needles are obtained which are soluble in water. The solution exhibits a bluish fluorescence in ultraviolet light.

Example 8

The process is conducted according to the directions of Example 1 but instead of α:β-di-[N-methyl-benzimidazyl-(2)]-ethylene, 2:5-di-[benzimidazyl-(2)]-furane is used.

The resulting light yellow powder possesses similar properties to the product of Example 1.

Example 9

An aqueous solution containing the compound obtained according to Example 2 is boiled under reflux for 3 hours and then allowed to cool.

The separated greenish yellow needles are filtered off, washed with water and dried.

The new compound of the probable formula

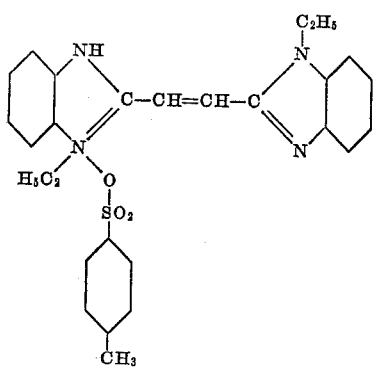

possesses similar properties to the imidazolium compound used as starting material.

Example 10

To a hot aqueous solution of 10 parts of the product obtained according to Example 9 is added an aqueous solution of 6 parts of potassium iodide and the whole is allowed to cool.

The separated iodide of the probable formula

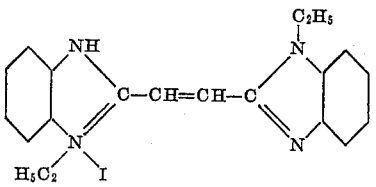

is filtered off, washed with water and dried.

It forms a yellow powder with similar properties to the compound obtained according to Example 9.

The perchlorate, which possesses similar properties, is obtained when instead of 6 parts of potassium iodide, 6 parts of potassium perchlorate are used.

Example 11

9 parts of α:β-di-[benzimidazyl-(2)]-ethylene disulfonic acid are heated with 50 parts of dimethyl sulfate for 10 hours at 140–150° C. After cooling, the whole is treated with alcohol and the separated condensation product filtered off, washed with alcohol and if necessary crystallized from water.

The yellowish powder is soluble in water with a bluish fluorescence.

Example 12

Undyed textile material of synthetic polyamide fibers, for example nylon or "Perlon," is treated in a bath ratio of 1:30 for 30 minutes at 70–75° C. in a bath containing 0.01% of the imidazolium compound obtained as described in the first paragraph of Example 1. After rinsing and drying, the textile material thus treated has a higher white content than the corresponding untreated material.

Example 13

Acetate artificial silk fabric is treated in a bath ratio of 1:50 for 20 minutes in a bath which contains 0.01% (calculated on the fabric) of the imidazolium compound obtained in accordance with the first paragraph of Example 2. After rinsing and drying the fabric thus treated has a higher white content than the corresponding untreated material.

Example 14

Polyester fibers, for example "Dacron" or "Terylene" are treated in a bath of 1:30 with 0.2% of the imidazolium compound described in Example 6 in a bath which contains 1 gram per liter of disodium phosphate. The material is then rinsed and dried. The resulting fibers possess a higher white content than the untreated material.

What is claimed is:

1. An imidazolium compound of the formula

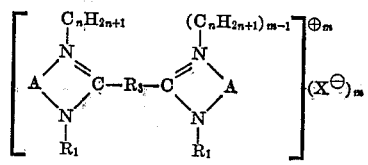

in which A indicates a benzene nucleus, two vicinal carbon atoms of which are linked to the two imidazole nitrogen atoms, $R_1$ stands for a member selected from the group consisting of an alkyl radical containing at the most two carbon atoms, a benzyl radical and a hydrogen atom, $R_3$ stands for a member selected from the group consisting of the radicals of the formulae

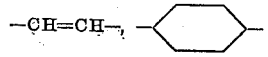

and

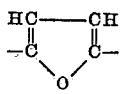

$m$ and $n$ stand for whole numbers of at the most 2, and X stands for an anion selected from the group consisting of halogen, $-O-SO_2-O-Y$ and $-O-SO_2-Z$, Y representing a low molecular alkyl radical and Z representing a monocyclic hydrocarbon radical of the benzene series.

2. An imidazolium compound of the formula

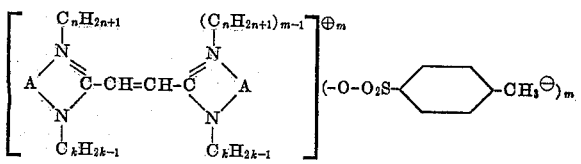

in which A indicates a benzene nucleus, two vicinal carbon atoms of which are linked to the two imidazole nitrogen atoms, and $k$, $m$ and $n$ stand for whole numbers of at the most 2.

3. An imidazolium compound of the formula

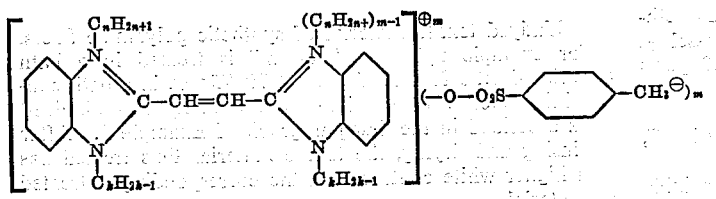

in which $k$, $m$ and $n$ indicate whole numbers of at the most 2.

4. The imidazolium compound of the formula

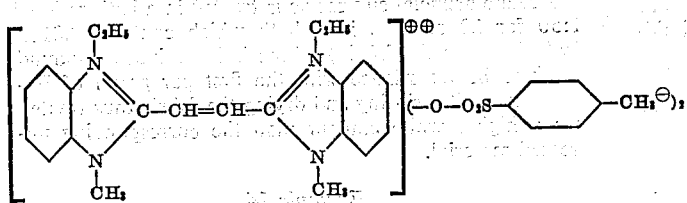

5. The imidazolium compound of the formula

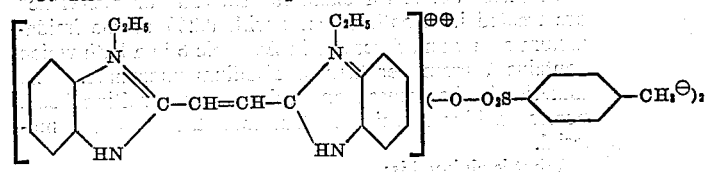

6. The imidazolium compound of the formula

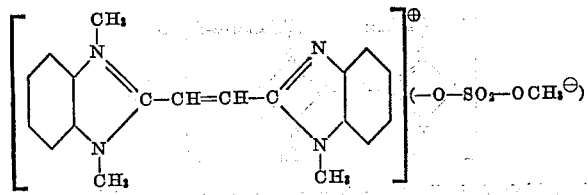

7. The imidazolium compound of the formula

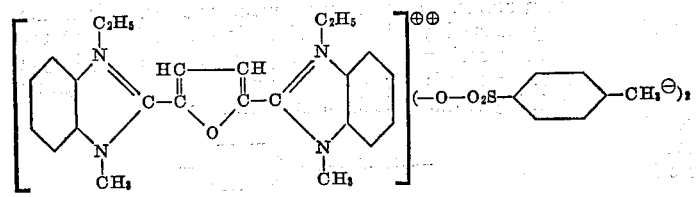

8. The imidazolium compound of the formula

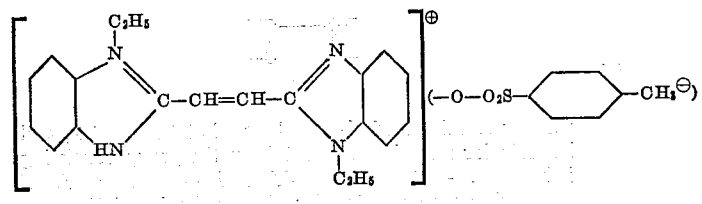

References Cited in the file of this patent
UNITED STATES PATENTS

| | | |
|---|---|---|
| 2,043,164 | Granacher | June 2, 1936 |
| 2,053,822 | Granacher et al. | Sept. 8, 1936 |
| 2,488,094 | Granacher et al. | Nov. 15, 1949 |
| 2,515,173 | Ackermann et al. | July 18, 1950 |

FOREIGN PATENTS

| | | |
|---|---|---|
| 588,972 | Great Britain | June 9, 1947 |

OTHER REFERENCES

Kiprianov et al.: Chem. Abstracts, vol. 42, col. 2254 (1948).